United States Patent
Serra et al.

(10) Patent No.: US 9,279,362 B2
(45) Date of Patent: Mar. 8, 2016

(54) METHOD FOR DETERMINING THE RATE OF RECIRCULATED EXHAUST GAS AT THE INLET OF A CYLINDER OF AN INTERNAL COMBUSTION ENGINE, AND ENGINE IMPLEMENTING SUCH A METHOD

(75) Inventors: Bruno Serra, Etampes (FR); Sylvain Hourlier, Arpajon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 407 days.

(21) Appl. No.: 13/878,129

(22) PCT Filed: Sep. 22, 2011

(86) PCT No.: PCT/FR2011/052195
§ 371 (c)(1),
(2), (4) Date: Jun. 21, 2013

(87) PCT Pub. No.: WO2012/045947
PCT Pub. Date: Apr. 12, 2012

(65) Prior Publication Data
US 2013/0255649 A1   Oct. 3, 2013

(51) Int. Cl.
*F02B 47/08* (2006.01)
*F02D 41/00* (2006.01)
*F02D 41/18* (2006.01)

(52) U.S. Cl.
CPC ............ *F02B 47/08* (2013.01); *F02D 41/0072* (2013.01); *F02D 41/187* (2013.01);
(Continued)

(58) Field of Classification Search
CPC . F02B 47/08; F02D 41/0072; F02D 41/0075; F02D 2200/04; F02D 2200/0402; F02D 2041/0075

USPC ......... 123/568.11, 568.12, 568.21; 73/114.74
See application file for complete search history.

(56) References Cited

U.S. PATENT DOCUMENTS 4,060,065 A * 11/1977 Hata et al. ................ 123/568.22
5,205,260 A *  4/1993 Takahashi et al. ............ 123/494
(Continued)

FOREIGN PATENT DOCUMENTS

EP       0 539 241       4/1993
WO    2004 055344      7/2004

OTHER PUBLICATIONS

International Search Report Issued Dec. 23, 2011 in PCT/FR11/052195 Filed Sep. 22, 2011.

*Primary Examiner* — Stephen K Cronin
*Assistant Examiner* — Kevin R Steckbauer
(74) *Attorney, Agent, or Firm* — Oblon, McClelland, Maier & Neustadt, L.L.P.

(57) ABSTRACT

A method determining a rate of recirculated exhaust gas (EGR rate) at an inlet of a cylinder of an internal combustion engine at a moment t, the exhaust gas being conveyed in a recirculation duct connecting an exhaust line of the engine to an intake line, and the EGR rate being equal to the ratio between flow rate of the recirculated gas and total gas flow rate in the intake line at a location of the intake line in question and at the moment in question. The method: a) determines at which moment t_intro preceding the moment t the gas, having arrived at the inlet of the cylinder at moment t, was fed into the intake line; b) determines the EGR rate at an outlet of the recirculation line to the intake line at the moment t_intro; and c) determines the EGR rate at the inlet to the cylinder at moment t based on the EGR rate at the outlet of the recirculation line to the intake line at moment t_intro, as determined in b).

18 Claims, 2 Drawing Sheets

Figure 1:
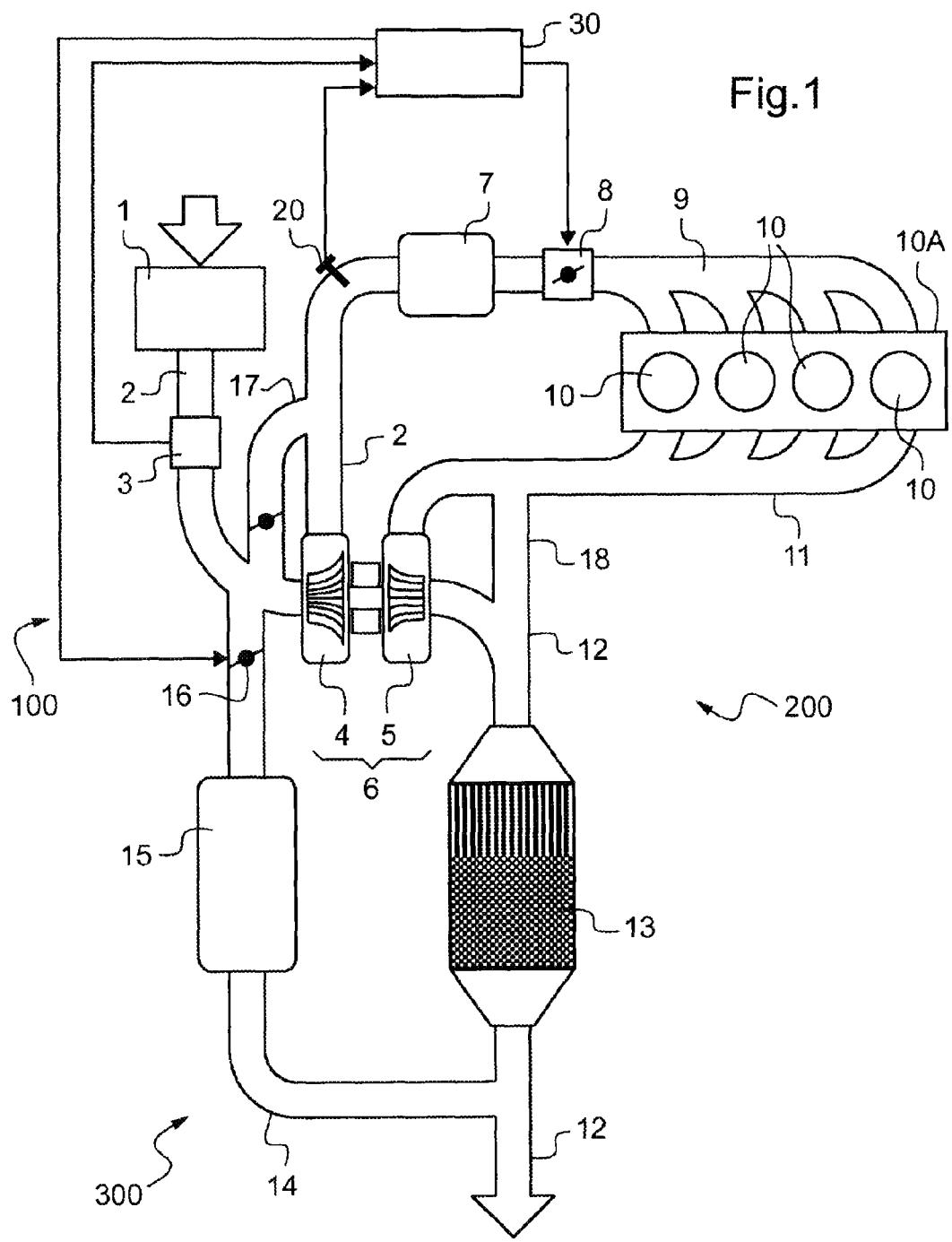

(52) U.S. Cl.
CPC ..... *F02D2041/0075* (2013.01); *F02D 2200/04* (2013.01); *F02D 2200/0402* (2013.01); *F02D 2200/0406* (2013.01); *Y02T 10/47* (2013.01)

(56) References Cited

U.S. PATENT DOCUMENTS

| | | | | |
|---|---|---|---|---|
| 5,273,019 A | * | 12/1993 | Matthews et al. | 123/406.48 |
| 5,383,126 A | * | 1/1995 | Ogawa et al. | 701/108 |
| 5,505,174 A | * | 4/1996 | Komoriya et al. | 123/406.48 |
| 6,032,656 A | * | 3/2000 | Itoyama et al. | 123/568.21 |
| 6,035,639 A | * | 3/2000 | Kolmanovsky et al. | 60/605.2 |
| 6,247,457 B1 | * | 6/2001 | Mallebrein | 123/520 |
| 6,481,423 B2 | * | 11/2002 | Muller et al. | 123/568.11 |
| 6,502,563 B2 | * | 1/2003 | Itoyama | 123/568.21 |
| 6,622,548 B1 | * | 9/2003 | Hernandez | 73/114.74 |
| 6,877,369 B2 | * | 4/2005 | Matsunaga et al. | 73/114.74 |
| 6,993,909 B2 | * | 2/2006 | Matsunaga et al. | 60/605.2 |
| 7,263,428 B2 | * | 8/2007 | Kobayashi et al. | 701/108 |
| 7,493,762 B2 | * | 2/2009 | Barbe et al. | 60/605.2 |
| 8,201,442 B2 | * | 6/2012 | Osburn et al. | 73/114.74 |
| 2002/0173898 A1 | | 11/2002 | Itoyama et al. | |
| 2006/0235603 A1 | | 10/2006 | Kobayashi et al. | |

* cited by examiner

METHOD FOR DETERMINING THE RATE OF RECIRCULATED EXHAUST GAS AT THE INLET OF A CYLINDER OF AN INTERNAL COMBUSTION ENGINE, AND ENGINE IMPLEMENTING SUCH A METHOD

TECHNICAL FIELD TO WHICH THE INVENTION RELATES

The present invention relates in a general manner to a method for determining a rate of recirculated exhaust gas, referred to as the EGR rate, at the inlet of a cylinder of an internal combustion engine at a moment t.

The invention also relates to an internal combustion engine implementing such a method.

TECHNOLOGICAL BACKGROUND

Some internal combustion engines incorporate a recirculation duct, which takes a portion of the exhaust gas circulating in an exhaust line of the engine, and reinjects it into an intake line of this engine. Exhaust gas recirculated in this way is referred to as EGR gas.

The EGR gas rate, referred to as the EGR rate, present in the gas mixture fed at a moment t into the cylinders of the engine, is a parameter used by an electronic control unit of the engine to regulate the functioning of the latter. The EGR rate at the inlet of the cylinder actually plays an important part in the quality of the combustion of the gas in the cylinders, the fuel consumption of the engine, the limitation of polluting emissions resulting from the combustion of gas, and for engine tuning in general.

The value of the EGR rate used by the electronic control unit is currently a value determined at the moment t at the outlet of the recirculation duct to the intake duct, and not at the inlet of the cylinder themselves.

Different methods are in fact known for determining this EGR rate at the outlet of the recirculation duct to the intake duct, for example by measuring the flow rate of the EGR gas and the flow rate of the fresh air mixed at this location in the intake line or by a calculation based on measured pressure and temperature values either side of a recirculation valve fitted along the path of this recirculation duct using the Barré Saint Venant formula.

However, the value of the EGR rate at the inlet of the cylinder at the moment t can be different from the value of the EGR rate at the outlet of the recirculation duct at the moment t: the value of the EGR rate taken into account by the electronic control unit is therefore not very precise.

OBJECT OF THE INVENTION

In order to remedy the disadvantages of the abovementioned state of the art, the object of the invention is a method allowing a precise determination of the EGR rate at the inlet of the cylinder of the engine at a moment t.

To that effect, the proposal according to the invention is a method for determining a rate of recirculated exhaust gas, referred to as the EGR rate, at the inlet of a cylinder of an internal combustion engine at a moment t, said recirculated exhaust gas being conveyed in a recirculation duct connecting an exhaust line of the engine to an intake line of the latter, and said EGR rate being equal to the ratio between the flow rate of the recirculated exhaust gas and the total gas flow rate in the intake line, at the location of the intake line in question and at the moment in question, according to which said method comprises:

a) determining at which moment t_intro preceding the moment t the gas, having arrived at the inlet of the cylinder at the moment t, was fed into the intake line, b) determining the EGR rate at the outlet of the recirculation duct to the intake line at the moment t_intro, c) determining the EGR rate at the inlet of the cylinder at the moment t on the basis of the EGR rate at the outlet of the recirculation duct to the intake line at the moment t_intro, as determined in step b).

The exhaust gas fed into the intake line at a given moment is conveyed for a certain time in this intake line before reaching the inlet of the cylinder. A discrepancy therefore exists between the value of the EGR rate at the outlet of the recirculation duct at the moment t and the value of the EGR rate at the moment t at the inlet of the cylinder: the gas arriving at the inlet of the cylinder at the moment t was fed into the intake line, at the outlet of the recirculation duct at a moment t_intro preceding the moment t.

Now, the EGR rate at the outlet of the recirculation duct can have changed between the moment t_intro and the moment t: the EGR rate at the outlet of the recirculation duct at t is therefore different in principle from the EGR rate at the inlet of the cylinder at the same moment t.

The difference between the moments t_intro and t is all the greater given the extensive length of the intake line.

The method according to the invention takes this difference into account and eliminates the error due to it from the estimation of the EGR rate at the inlet of the cylinder.

Other advantageous, and not restrictive, characteristics of the method according to the invention comprise:

in step c), identifying the required EGR rate at the inlet of the cylinder at the moment t with the EGR rate at the outlet of the recirculation duct at the moment t_intro as determined in step b);

in step a), performing the following steps:
  a1) determining and memorizing an elementary mass of gas fed into the intake line at the outlet of the recirculation duct at different successive moments t_i preceding the moment t,
  a2) at the moment t, determining the total mass of gas fed into the intake line at the outlet of the recirculation duct since each moment t_i preceding the moment t until the moment t,
  a3) at this moment t, determining the total mass of gas contained in the intake line between the outlet of the recirculation duct and the inlet of the cylinder,
  a4) comparing this total mass of gas contained in the intake line at the moment t with the total mass of gas fed into the intake line at the outlet of the recirculation duct since each moment t_i until the moment t and determining the moment t_intro on the basis of this comparison;

in step a4), determining the moment t_intro as the moment t_i at which the total mass of gas contained in the intake line at the moment t, as determined in step a1), is closest to the total mass of gas fed into the intake line at the outlet of the recirculation duct since each moment t_i until the moment t, as determined in step a2);

in step a4), determining the moment t_intro as the moment t_i at which the total mass of gas contained in the intake line at the moment t, as determined in step a1), becomes greater than the total mass of gas fed into the intake line at the outlet of the recirculation duct since each moment t_i until the moment t, as determined in step a2);

in step b), performing the following steps:
  b1) determining and memorizing an EGR rate at the outlet of the recirculation duct at each moment t_i, b2) determining the EGR rate at the outlet of the recirculation duct at the moment t_intro on the basis of the EGR rate at the outlet of the recirculation duct, as determined in step b1), for the moment t_i nearest to the moment t_intro;

in step b1), measuring the flow rate of recirculated exhaust gas fed into the intake line at each moment t_i with a flowmeter;

or, alternatively, according to a different measurement method for the same physical quantity, in step b1), determining the flow rate of recirculated exhaust gas fed into the intake line at the moment t_i through a calculation taking account of the temperature and pressure of the exhaust gas in the recirculation duct;

since a valve for regulating the flow rate of the exhaust gas is fitted in the recirculation duct, in step b1), calculating the flow rate of recirculated exhaust gas fed into the intake line at the moment t_i on the basis of the pressure of the gas circulating either side of this valve;

in step b1), measuring the flow rate of fresh air fed into the intake line upstream of the outlet of the recirculation duct with a flowmeter;

or, alternatively, according to a different measurement method allowing the same result to be obtained, in step b1), measuring the total flow rate of gas pumped by a compressor fitted on the intake line downstream of the outlet of the recirculation duct;

in step a1), determining the elementary mass of gas fed into the intake line at the outlet of the recirculation duct at each moment t_i on the basis of a total flow rate of gas pumped by a compressor fitted on the intake line downstream of the outlet of the recirculation duct;

in step a3), determining the mass of gas contained in the intake line at the moment t on the basis of a volume of the intake line between the outlet of the recirculation duct and the inlet of the cylinder, and on the basis of a temperature and pressure of the gas circulating in the intake line at this moment t;

said temperature of the gas circulating in the intake line at the moment t is estimated on the basis of the operating conditions of the engine at this moment t;

since the gas circulating in the intake line passes through a device for cooling the gas, said temperature of the gas circulating in the intake line is determined on the basis of a temperature value measured at the moment t by a temperature sensor fitted upstream of the cooling device and/or on the basis of a temperature value measured at the moment t by a temperature sensor fitted downstream of the cooling device;

since an intake flap is fitted on the intake line downstream of a compressor, said pressure of the gas circulating in the intake line is determined on the basis of the pressure measured at the moment t by a pressure sensor fitted upstream of said intake flap and/or on the basis of the pressure measured at the moment t by a pressure sensor fitted downstream of said intake flap.

The invention also relates to an internal combustion engine of a motor vehicle incorporating an intake line supplying intake gas to at least one cylinder of the engine and an exhaust line conveying the exhaust gas after its combustion in said cylinder, a portion of said exhaust gas being recirculated in a recirculation duct connecting the exhaust line of the engine to said intake line, furthermore incorporating an electronic control unit programmed to determine a rate of recirculated exhaust gas, referred to as the EGR rate, at the inlet of the cylinder at a moment t, in accordance with the method as described above.

DETAILED DESCRIPTION OF AN EMBODIMENT EXAMPLE

The description that will follow, with reference to the annexed drawings, given as an example, not restrictive, will provide a good understanding of what the invention comprises and how it can be embodied.

Figure 2:
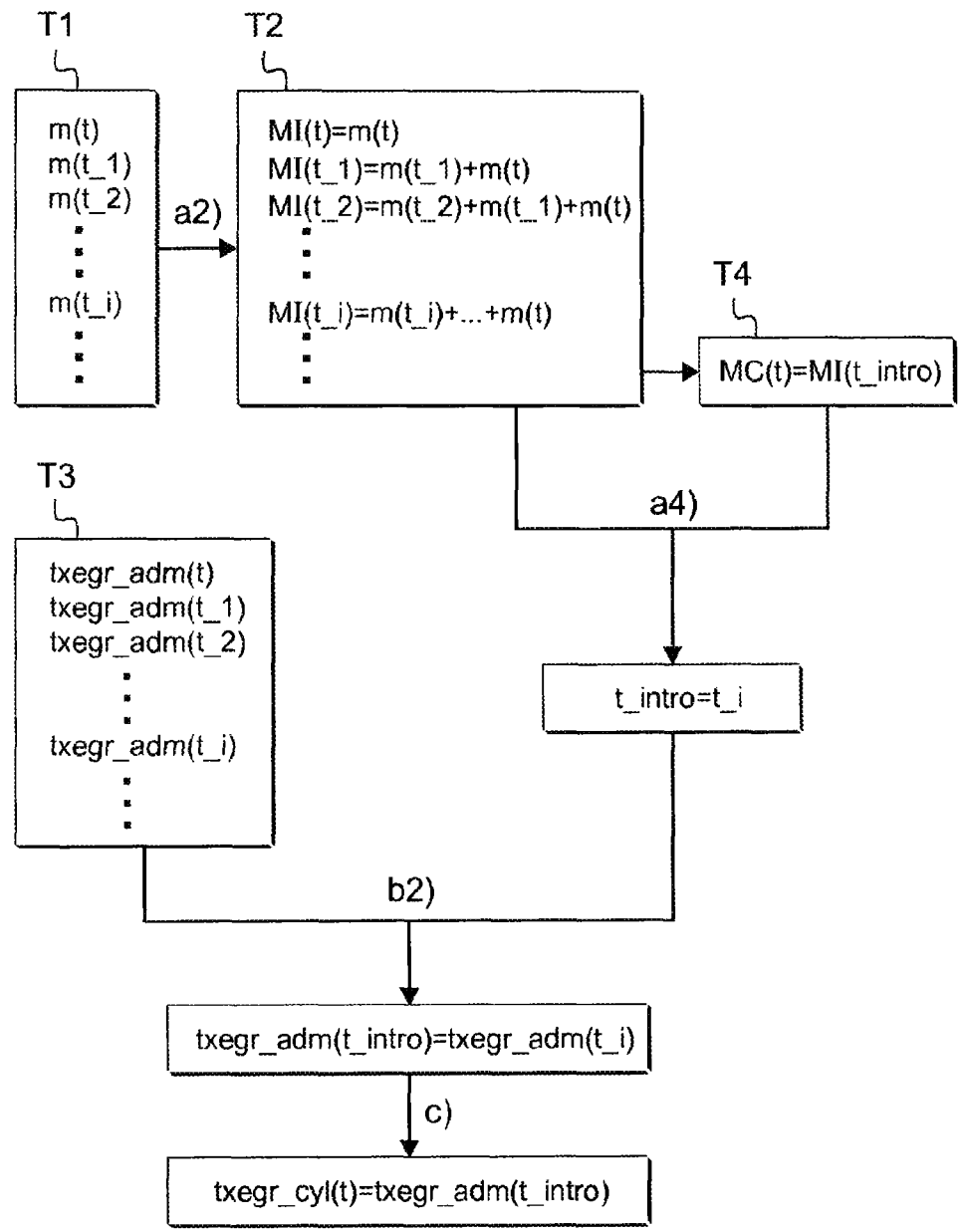

In the annexed drawings,

FIG. 1 diagrammatically illustrates an engine of a motor vehicle in which the method according to the invention can be embodied, and FIG. 2 diagrammatically illustrates the steps of the method according to the invention.

In the description, the terms "upstream" and "downstream" will be used according to the direction of the flow of gas, from the point where fresh air is taken from the atmosphere to the outlet to atmosphere of the exhaust gas.

Device

The internal combustion engine incorporates an intake line 100 that takes fresh air from the atmosphere. This intake line 100 incorporates an intake duct 2, along whose path an air filter 1 is fitted, which filters the fresh air taken from the atmosphere, a flowmeter 3, which measures the flow rate of fresh air fed into the intake duct 2, a compressor 4, which compresses the fresh air filtered by the air filter 1, and a primary air cooler 7, which cools this compressed fresh air.

The intake line 100 also incorporates an air distributor 9, into which the intake duct 2 discharges, and which is configured to distribute the gas circulating in the intake duct 2 towards each of the four cylinders 10 of an engine block 10A.

An intake flap 8 fitted on the path of the intake duct upstream of said distributor 9 allows the regulation of the flow rate of gas discharging into this air distributor 9.

At the outlet of the cylinders 10, the engine incorporates an exhaust line 200 extending from an exhaust manifold 11, into which the exhaust gas, burned beforehand in the cylinders 10, is discharged.

This exhaust gas is then conveyed towards the outside of the engine through an exhaust duct 12 of this exhaust line 200.

The exhaust line 200 moreover incorporates, in the direction of the flow of the exhaust gas, a turbine 5 that is driven in rotation by the flow of exhaust gas exiting the exhaust manifold 12 and a catalytic converter 13 for treating the exhaust gas.

The turbine 5 is coupled to the compressor 4 by mechanical coupling means such as a transmission shaft, such that the compressor 4 and the turbine 5 together form a turbocompressor 6.

In the example illustrated in FIG. 1, bypass ducts 17, 18 are inserted either side of the compressor 4 and the turbine 5. They allow the gas circulating respectively in the intake line 100 and in the exhaust line 200 to bypass the compressor 4 and the turbine 5 in certain operating ranges of the engine.

The engine furthermore incorporates a line 300 for recirculating the exhaust gas, incorporating a duct 14 for recirculating exhaust gas at low pressure, with its inlet inserted in the exhaust duct 12, downstream of the turbine 5 and with its outlet in intake duct 2, upstream of the compressor 4.

The recirculation duct 14 therefore takes a portion of the exhaust gas circulating in the exhaust line 200 and reinjects it into the intake duct 2. The gas is then mixed with the fresh air fed into the cylinders 10 with the aim of reducing the polluting emissions from the engine, in particular emissions of nitrogen oxide in the case of diesel engines, and with the aim of reducing fuel consumption, notably in the case of petrol engines.

The exhaust gas recirculated in the recirculation line 300 is referred to hereinafter as "EGR gas".

This recirculation line 300 also incorporates a secondary air cooler 15 fitted on the path of the recirculation duct 14 to cool the EGR gas, followed by a valve, referred to as the EGR valve 16 for regulating the flow of EGR gas discharged into the air distributor.

The internal combustion engine furthermore incorporates a line (not illustrated) for injecting fuel into the cylinders 10.

In order to control the different units of the internal combustion engine, an electronic control unit 30 is provided, appropriate for receiving data from different sensors of the engine, notably data indicating the temperature, pressure and flow rate of the gas at different locations of the engine. The electronic control unit 30 notably controls the opening of the intake flap 8 and that of the EGR valve 16.

According to the invention, the electronic control unit of the vehicle according to the invention is programmed to determine an EGR rate at the inlet of the cylinder of the engine at the moment t in accordance with the method described below.

Method

In the following, the expression "EGR rate" designates the ratio between the flow rate of the EGR gas and the total flow rate of the gas in the intake line, at a given location of the intake line and at a given moment.

The EGR rate at the inlet of the cylinders at the moment t will therefore be denoted txegr_cyl(t) and the EGR rate at the moment t at the outlet of the recirculation duct 14, that is to say immediately after the location where this recirculation duct 14 discharges into the intake line 100, will be denoted txegr_adm(t).

According to the method conforming with the invention,
in a step a), the electronic control unit 30 determines at which moment t_intro preceding the moment t the gas, having arrived at the inlet of the cylinders 10 at the moment t, was fed into the intake line 100, then
in a step b), the electronic control unit 30 determines the EGR rate txegr_adm(t_intro) at the outlet of the recirculation duct 14 to the intake line 100 at the moment t_intro, and
in a step c), the electronic control unit 30 determines the EGR rate txegr_cyl(t) at the inlet of the cylinder 10 at the moment t on the basis of the EGR rate txegrjadm(t_intro) at the outlet of the recirculation duct to the intake line at the moment t_intro as determined in step b).

More precisely, in step a), the electronic control unit 30 performs the sub-steps described below.

In a sub-step a1) of step a), the electronic control unit 30 determines and memorizes an elementary mass m(t_i) of gas fed into the intake line 100 at the outlet of the recirculation duct 14 at different successive moments t_i preceding the moment t.

The electronic control unit 30 operates for example in time steps: the moments t_i are thus separated by regular time intervals Dt. The elementary mass values of gas associated with each moment t_i are memorized in a first table T1, illustrated in FIG. 2.

The choice of the time interval Dt separating the moments t_i therefore depends on the maximum size this table can have on the basis of the calculation capacity of the electronic control unit 30.

Each moment t_i is therefore equal to t−i·Dt, with the index i being between 1 and an integer N corresponding to the value number of the elementary mass that can be memorized in said table T1.

For example, in order to perform a sampling of the elementary mass values m(t_i) for a 5 second period before the time t, the electronic control unit can memorize, for example, 50 elementary mass values m(t_i) corresponding to moments t_i separated by an interval Dt equal to 100 milliseconds, or 100 elementary mass values m(t_i) corresponding to moments t_i separated by a time interval Dt equal to 50 milliseconds.

In the case of the table containing 100 values, since this table is larger, the calculation times at constant time intervals will be extended, increasing for example from 5 to 10 seconds, or else the time intervals Dt will be reduced, decreasing here for example from 100 to 50 milliseconds, which allows a constant calculation time to be preserved.

At each moment t_i, the electronic control unit 30 determines, for example, the elementary mass m(t_i) of gas fed into the intake line at the outlet of the recirculation duct 14 on the basis of a total flow rate Qcomp(t_i) of gas pumped by the compressor 4. In practice, this elementary mass m(t_i) corresponds to the mass of gas fed into the intake line for a duration Dt when the gas flow rate is equal to the total flow rate Qpomp(t_i) of gas pumped by the compressor 4 at the moment t_i.

This total flow rate Qcomp of gas pumped by the compressor 4 is measured, for example, by a flowmeter fitted on the path of the intake duct 2, between the outlet of the recirculation duct 14 to the intake line 100 and compressor 4.

If the total flow rate Qcomp of gas pumped by the compressor 4 is expressed in the form of a mass flow rate of gas, the required elementary mass m(t_i) of gas associated with the moment t_i will be equal to this total mass flow rate Qcomp, which the time interval Dt multiplies between two moments t_i.

If the total flow rate Qcomp of gas pumped by the compressor 4 is expressed in the form of a volume flow rate of gas, the required elementary mass m(t_i) of gas associated with the moment t_i will be equal to this total volume flow rate, which the time interval Dt multiplies between two moments t_i and the density of the gas.

In a sub-step a2) of the step a), the electronic control unit 30 determines a total mass Ml(t_i) of gas fed into the intake line 100 at the outlet of the recirculation duct 14 since each moment t_i preceding the moment t until the moment t.

This total mass Ml(t_i) of fed gas corresponds to the sum of the elementary mass values m(t_i) fed at each moment between the moment t_i and the moment t.

The values of these total masses Ml(t_i) of gas fed into the intake line are memorized in a second table T2 (see FIG. 2).

In a sub-step a3) of the step a), the electronic control unit 30 determines the mass MC(t) of gas contained in the intake line 100 between the outlet of the recirculation duct 14 and the inlet of the cylinder 10 at the moment t.

This mass MC(t) of gas contained in the intake line 100 corresponds to the sum of the elementary mass values m(t_i) of gas fed into the intake line between the moment t_intro and the moment t, that is to say, to the total mass Ml(t_intro) of gas fed into the intake line 100 at the outlet of the recirculation duct 14 since said moment t_intro until the moment t. This mass MC(t)=Ml(t_intro) of gas contained in the intake line 100 is memorized in a table T4 of the memory of the electronic control unit 30.

The mass MC(t) of gas contained in the intake line at the moment t_is determined, for example, by a calculation on the basis of a volume V of the intake line 100 between the outlet of the recirculation duct 14 and the inlet of the cylinder 10, of a temperature Temp(t) and of a pressure P(t) of the gas circulating in the intake line 100 at this moment t, using the formula:

$$MC(t) = (P(t) \cdot V)/(r \cdot Temp(t))$$

where r is the ideal gas constant divided by the molar mass of the gas.

The temperature Temp(t) of the gas circulating in the intake line at the moment t is a temperature averaged along the whole of the intake line 100.

The temperature Temp(t) of the gas circulating in the intake line 100 actually varies between its introduction and its arrival in the cylinders; it is in turn heated in the compressor 4 and cooled in the primary air cooler 7.

This average temperature Temp(t) can be estimated on the basis of the engine operating conditions at this moment t. It then results from mapping the average temperature on the basis of the engine operating conditions saved to memory in the electronic control unit 30.

This average temperature Temp(t) can also be estimated from the average of the temperature values measured by two temperature sensors fitted in the intake duct 2, near the primary air cooler 7, upstream and downstream of the latter.

Finally, it is possible to consider estimating this temperature Temp(t) from the average between a value measured by one of the two sensors fitted near the primary air cooler 7, upstream or downstream of the latter, and an estimated value of the temperature at the other sensor.

In an engine where the intake flap 8 is fitted downstream of the primary air cooler 7, as in the example illustrated in FIG. 1, the pressure P(t) of the gas circulating in the intake line 100 at the moment t is determined on the basis of the pressure measured at the moment t by a pressure sensor 20 fitted upstream of the supply flap 8. The pressure P(t) is preferably equal to the pressure referred to as "supercharging" measured by this pressure sensor 20.

In an engine where the intake flap is fitted upstream of the primary air cooler, the pressure P(t) of the gas circulating in the intake line at the moment t is determined on the basis of the pressure measured at the moment t by a pressure sensor fitted downstream of said supply flap, in the manifold 9. The pressure P(t) is preferably equal to the pressure referred to as "manifold" measured by this sensor.

If the intake line of the engine does not incorporate an intake flap, the pressure P(t) is equal to the pressure measured by a sensor fitted in the manifold 9.

In a sub-step a4) of the step a), the electronic control unit 30 compares the mass MC(t) of gas contained in the intake line 100 at the moment t and the total mass Ml(t_i) of gas, associated with each moment t_i, fed into the intake line 100 at the outlet of the recirculation duct 14.

The electronic control unit 30 uses this comparison to determine the moment t_intro, since MC(t) Ml(t_intro).

A different method of determining this moment t_intro can be considered.

In a first variant, the electronic control unit 30 identifies the moment t_intro at the moment t_i at which the difference between the mass MC(t) of gas contained in the intake line 100 at the moment t and the total mass Ml(t_i) of gas fed into the intake line 100 since the moment t_i is least.

In a second variant, the electronic control unit 30 identifies the moment t_intro at the moment t_i at which the mass MC(t) of gas contained in the intake line 100 at the moment t becomes greater than the total mass Ml (t_i) of gas fed into the intake line 100 since the moment t_i.

In other words, according to these two variants, the electronic control unit 30 searches for the index i, for which the comparison between the mass MC(t) of gas contained in the intake line and the total mass Ml(t_i) of gas fed into the intake line since the moment t_i verifies a predefined condition.

In a third variant, the electronic control unit 30 performs an interpolation of the total mass values Ml(t_i) of gas fed into the intake line 100 and thereby deduces the exact moment t_intro at which one of the total mass values of gas fed into the intake line 100 is equal to the mass MC(t) of gas contained in the intake line 100 at the moment t.

Any calculation method known to a person skilled in the art can also be considered. The moment t_intro can also be determined for example as the weighted mean of the two values t_i either side of it.

In step b), the electronic control unit 30 performs a sub-step b1) for determining and memorizing the EGR rate txegr_adm (t_i) at the outlet of the recirculation duct 14 at each moment t_i.

In practice, this sub-step b1) is performed simultaneously with sub-step a1).

This EGR rate txegr_adm(t_i) is equal to the flow rate Qegr(t_i) of EGR gas fed into the intake line 100 at the outlet of the recirculation duct 14 at the moment t_i, divided by the total flow rate Qcomp(t_i) of gas pumped into the intake line 100 by the compressor 4 at this moment t_i.

The flow rate Qegr(t_i) of EGR gas fed into the intake line at each moment t_i is either measured by a flowmeter (not illustrated) fitted on the path of the recirculation duct 14, or estimated by a calculation taking account of the temperature and pressure of the EGR gas in the recirculation duct 14.

More precisely, in step b1), the electronic control unit 30 calculates the flow rate Qegr(t_i) of EGR gas fed into the intake line at the moment t_i on the basis of the pressure of the gas circulating either side of the EGR valve 16.

The pressure of the EGR gas circulating either side of this EGR valve 16 is measured, for example, by two pressure sensors fitted in the recirculation duct 16 either side of this EGR valve 16.

As far as the total flow rate Qcomp(t_i) pumped by the compressor 4 is concerned, it can either be measured by a flowmeter fitted on the intake line 100, downstream of the outlet of the recirculation duct 14, or calculated as the sum of the flow rate of the fresh air at the inlet of the intake line 100 measured by the flowmeter 2 and the flow rate Qegr(t_i) of the EGR gas fed into the intake line 100.

The EGR rates txegr_adm(t_i) determined at each moment t_i are saved to memory in a table T3 of the electronic control unit 30 (FIG. 2).

In a sub-step b2), the electronic control unit 30 determines the EGR rate txegr_adm(t_intro) at the outlet of the recirculation duct at the moment t_intro on the basis of the EGR rate txegr_adm(t_i) at the outlet of the recirculation duct at the moment t_i nearest to the moment t_intro.

According to the first variant of the method, the moment t_intro is equal to the moment t_i at which the difference between the mass MC(t) of gas contained in the intake line 100 at the moment t and the total mass Ml(t_i) of gas fed into the intake line 100 since the moment t_i is least. The required EGR rate txegr_adm(t_intro) is therefore equal to the EGR rate txegr_adm(t_i) saved to memory at this moment t_i.

According to the second variant of the method, the moment t_intro is equal to the moment t_i at which the mass MC(t) of gas contained in the intake line 100 at the moment t becomes greater than the total mass Ml(t_i) of gas fed into the intake line 100 since the moment t_i. The required EGR rate txegr_adm(t_intro) is therefore equal to the EGR rate txegr_adm(t_i) saved to memory at this moment t_i.

In other words, according to these two variants, the electronic control unit 30 identifies the EGR rate txegr_adm(t_intro) at the outlet of the recirculation duct 14 at the moment t_intro with the EGR rate saved to memory in the table T4 at the corresponding index i as determined in step a4).

According to the third variant of the method, the electronic control unit 30 performs an interpolation of the values of the EGR rate txegr_adm(t_i), and the required EGR rate is then equal to the EGR rate determined by this interpolation at the exact moment t_intro, previously determined.

Any calculation method known to a person skilled in the art can also be considered. The EGR rate txegr_adm(t_intro) can also be determined, for example, as the weighted mean of the two EGR rates corresponding to the moments either side of the moment t_intro.

Finally, in step c), the required EGR rate txegr_cyl(t) at the inlet of the cylinder at the moment t_is identified with the EGR rate txegr_adm(t_intro) at the outlet of the recirculation duct at the moment t_intro as determined in step b).

The present invention is in no way limited to the embodiments described and illustrated, but a person skilled in the art will know how to bring about any variant in accordance with his/her thinking.

The invention claimed is:

1. A method of controlling a flow rate of gas based on a determined rate of recirculated exhaust gas, as an EGR rate, at an inlet of a cylinder of an internal combustion engine at a moment t, the recirculated exhaust gas being conveyed in a recirculation duct connecting an exhaust line of the engine to an intake line, and the EGR rate being equal to a ratio between a flow rate of the recirculated exhaust gas and a total gas flow rate in the intake line, at a predetermined location of the intake line and at a preceding moment t_intro, the method comprising:
   a) determining, using electronic control unit circuitry, at which preceding moment t_intro preceding the moment t gas, having arrived at the inlet of the cylinder at the moment t, was fed into the intake line;
   b) determining, using the electronic control unit circuitry, the EGR rate at an outlet of the recirculation duct to the intake line at the preceding moment t_intro;
   c) determining, using the electronic control unit circuitry, the EGR rate at the inlet of the cylinder at the moment t based on the EGR rate at the outlet of the recirculation duct to the intake line at the preceding moment t_intro, as determined in said b); and
   d) outputting, using the electronic control unit circuitry, a signal to control the flow rate of the gas based on said determining the EGR rate, as determined in said c),
   wherein said a) includes:
   a1) determining and memorizing an elementary mass of gas fed into the intake line at the outlet of the recirculation duct at different successive moments t_i preceding the moment t,
   a2) at the moment t, determining a total mass of gas fed into the intake line at the outlet of the recirculation duct since each said successive moment t_i preceding the moment t until the moment t,
   a3) at the moment t, determining a total mass of gas contained in the intake line between the outlet of the recirculation duct and the inlet of the cylinder, and
   a4) comparing the total mass of gas contained in the intake line at the moment t with the total mass of gas fed into the intake line at the outlet of the recirculation duct since each said successive moment t_i preceding the moment t until the moment t and determining the moment t_intro based on said comparing.

2. The method as claimed in claim 1, wherein said c) includes identifying a required EGR rate at the inlet of the cylinder at the moment t with the EGR rate at the outlet of the recirculation duct at the preceding moment t_intro as determined in said b).

3. The method as claimed in claim 1, wherein said a4) includes determining the moment t_intro as the moment t_i at which the total mass of gas contained in the intake line at the moment t, as determined in said a1), is closest to the total mass of gas fed into the intake line at the outlet of the recirculation duct since each said successive moment t_i until the moment t, as determined in said a2).

4. The method as claimed in claim 1, wherein said a4) includes determining the moment t_intro as the successive moment t_i at which the total mass of gas contained in the intake line at the moment t, as determined in said a1), becomes greater than the total mass of gas fed into the intake line at the outlet of the recirculation duct since each said successive moment t_i until the moment t, as determined in said a2).

5. The method as claimed in claim 1, wherein said b) includes:
   b1) determining and memorizing the EGR rate at the outlet of the recirculation duct at each said successive moment t_i;
   b2) determining the EGR rate at the outlet of the recirculation duct at the moment t_intro based on the EGR rate at the outlet of the recirculation duct, as determined in said b1), for the successive moment t_i nearest to the moment t_intro.

6. The method as claimed in claim 5, wherein said b1) includes measuring the flow rate of recirculated exhaust gas fed into the intake line at each said successive moment t_i.

7. The method as claimed in claim 5, wherein said b1) includes determining the flow rate of recirculated exhaust gas fed into the intake line at the successive moment t_i through a calculation taking account of temperature and pressure of the exhaust gas in the recirculation duct.

8. The method as claimed in claim 7,
   wherein a valve for regulating the flow rate of the exhaust gas is fitted in the recirculation duct, and
   wherein said b1) includes calculating the flow rate of recirculated exhaust gas fed into the intake line at each said successive moment t_i preceding the moment t based on the pressure of the gas circulating on either side of the regulating valve.

9. The method as claimed in claim 5, wherein said b1) includes measuring a flow rate of fresh air fed into the intake line upstream of the outlet of the recirculation duct with a flowmeter.

10. The method as claimed in claim 5, wherein said b1) includes measuring a total flow rate of gas pumped by a compressor fitted on the intake line downstream of the outlet of the recirculation duct.

11. The method as claimed in claim 1, wherein said a1) includes determining an elementary mass of gas fed into the intake line at the outlet of the recirculation duct at each said successive moment t_i preceding the moment t based on a total flow rate of gas pumped by a compressor fitted on the intake line downstream of the outlet of the recirculation duct.

12. The method as claimed in claim 1, wherein said a3) includes determining a mass of gas contained in the intake line at the moment t based on a volume of the intake line between the outlet of the recirculation duct and the inlet of the cylinder, and based on a temperature and pressure of the gas circulating in the intake line at the moment t.

13. The method as claimed in claim 12, wherein the temperature of the gas circulating in the intake line at the moment t is estimated based on operating conditions of the engine at the moment t.

14. The method as claimed in claim 12, wherein the gas circulating in the intake line passes through a device for cooling the gas, and the temperature of the gas circulating in the intake line is determined based on a temperature value measured at the moment t upstream of the cooling device and/or based on a temperature value measured at the moment t downstream of the cooling device.

15. The method as claimed in claim 12, wherein an intake flap is fitted on the intake line downstream of a compressor, and the pressure of the gas circulating in the intake line is determined based on the pressure measured at the moment t by a pressure sensor fitted upstream of the intake flap and/or based on the pressure measured at the moment t downstream of the intake flap.

16. The method as claimed in claim 1, wherein the flow rate of the gas to control using the signal is the flow rate of the recirculated exhaust gas.

17. An internal combustion engine of a motor vehicle comprising:
- an intake line supplying intake gas to at least one cylinder of the engine and an exhaust line conveying the exhaust gas after combustion thereof in the cylinder;
- a portion of the exhaust gas being recirculated in a recirculation duct connecting the exhaust line of the engine to the intake line;
- electronic control circuitry configured control a flow rate of gas based on a determined rate of recirculated exhaust gas, as an EGR rate, at an inlet of the at least one cylinder at a moment t, the control of the flow rate of gas by the electronic control circuitry including:
  a) determining at which preceding moment t_intro preceding the moment t gas, having arrived at the inlet of the cylinder at the moment t, was fed into the intake line;
  b) determining the EGR rate at an outlet of the recirculation duct to the intake line at the preceding moment t_intro;
  c) determining the EGR rate at the inlet of the cylinder at the moment t based on the EGR rate at the outlet of the recirculation duct to the intake line at the preceding moment t_intro, as determined in said b); and
  d) outputting a signal to control the flow rate of the gas based on said determining the EGR rate, as determined in said c),
wherein said a) includes:
  a1) determining and memorizing an elementary mass of gas fed into the intake line at the outlet of the recirculation duct at different successive moments t_i preceding the moment t,
  a2) at the moment t, determining a total mass of gas fed into the intake line at the outlet of the recirculation duct since each said successive moment t_i preceding the moment t until the moment t,
  a3) at the moment t, determining a total mass of gas contained in the intake line between the outlet of the recirculation duct and the inlet of the cylinder, and
  a4) comparing the total mass of gas contained in the intake line at the moment t with the total mass of gas fed into the intake line at the outlet of the recirculation duct since each said successive moment t_i preceding the moment t until the moment t and determining the moment t_intro based on said comparing.

18. The internal combustion engine as claimed in claim 17, wherein the flow rate of the gas to control using the signal is the flow rate of the recirculated exhaust gas.

* * * * *